INVENTORS
VICTOR E. RIMSHA
JAMES A. KOZEL

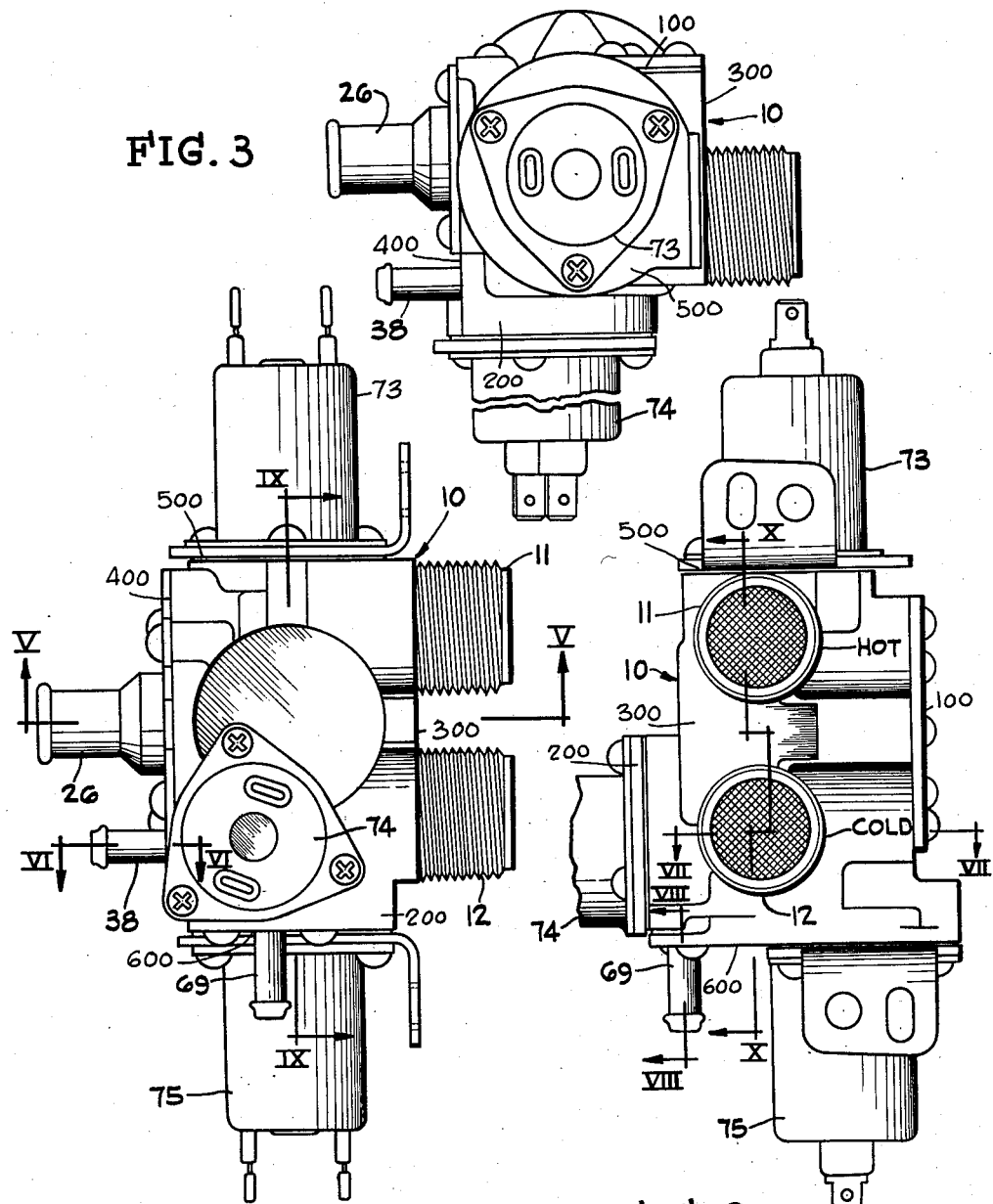

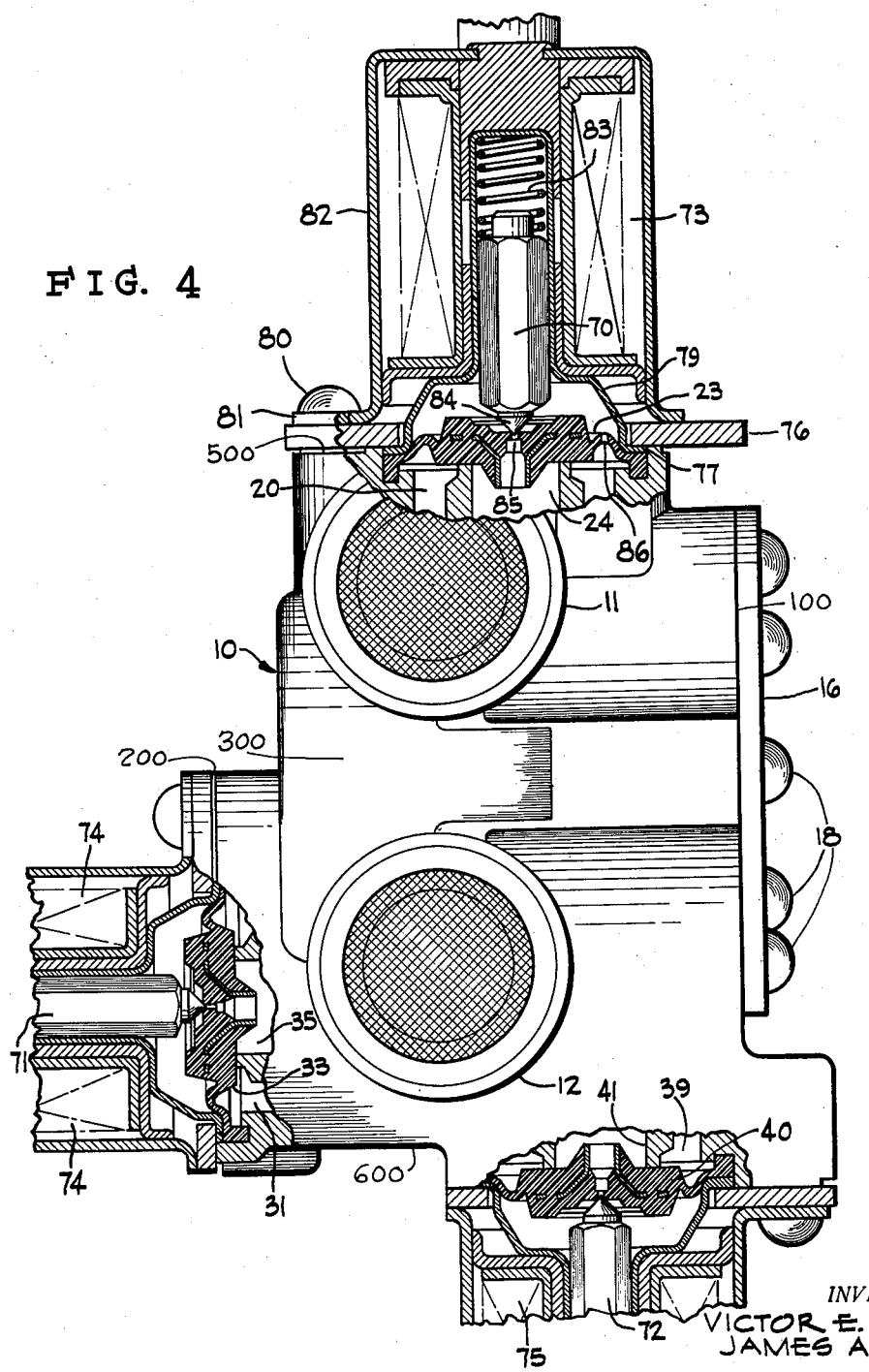

Sept. 22, 1959 V. E. RIMSHA ET AL 2,905,386
THERMOSTATIC MIXING VALVE
Filed Aug. 13, 1956 4 Sheets-Sheet 4

INVENTORS
VICTOR E. RIMSHA
JAMES A. KOZEL

BY

ATTORNEYS

United States Patent Office 2,905,386
Patented Sept. 22, 1959

2,905,386

THERMOSTATIC MIXING VALVE

Victor E. Rimsha and James A. Kozel, Chicago, Ill., assignors to The Dole Valve Company, Chicago, Ill., a corporation of Illinois Application August 13, 1956, Serial No. 603,497

3 Claims. (Cl. 236—12)

This invention relates to improvements in thermostatically controlled fluid mixing valves for delivering hot water, tempered water at various intermediate temperatures between the temperature of the hot and the cold water and affording a source of supply of cold water independently of the delivery of hot and cold water.

A principal object of the invention is to provide an improved form of thermostatically controlled valve for mixing hot and cold water and delivering hot water at the temperature of the water entering the valve, a tempered water under thermostatic control or mixed with hot water, and cold water for condensing purposes independently of the delivery of hot or mixed water.

Another object of the invention is to provide a solenoid controlled valve particularly adapted for combined washing and drying machines and the like, for supplying hot or tempered water for washing and rinsing purposes, cold water independently of the supply of hot or tempered water for condensing the moisture removed from the clothes during a drying operation, and affording an additional supply of water for actuating a device to be operated.

A still further object of the invention is to provide an improved form of mixing valve having hot and cold water inlets leading directly to a mixing chamber and having a hot water by-pass around the mixing chamber with one outlet for delivering either hot water or tempered water under thermostatic control and another outlet for delivering cold water for condensing the moisture removed from the clothes during a drying operation all under the cyclic control of a washing machine and the like.

Still another object of the invention is to provide an efficient form of mixing valve having a central mixing chamber with hot and cold water inlets leading into the mixing chamber in which water is metered thereto by a thermostatically controlled valve element, and in which the cold water inlet is so arranged as to deliver cold water into the mixing chamber, cold water for condensing purposes independently of the delivery of cold water into the mixing chamber and to afford a third source of supply of cold water for operating an actuator and the like.

These and other objects of the invention will appear from time to time as the following specification proceeds and with reference to the accompanying drawings wherein:

Figure 1 is a view in side elevation of a mixing valve constructed in accordance with the invention;

Figure 2 is a front view of the valve shown in Figure 1;

Figure 3 is a top plan view of the valve shown in Figures 1 and 2;

Figure 4 is an enlarged front end view of the valve shown in Figures 1, 2 and 3 with certain parts broken away and certain other parts shown in section in order to illustrate the solenoid controlled pressure operated valves controlling the flow of water at various selected temperatures;

Figure 5:
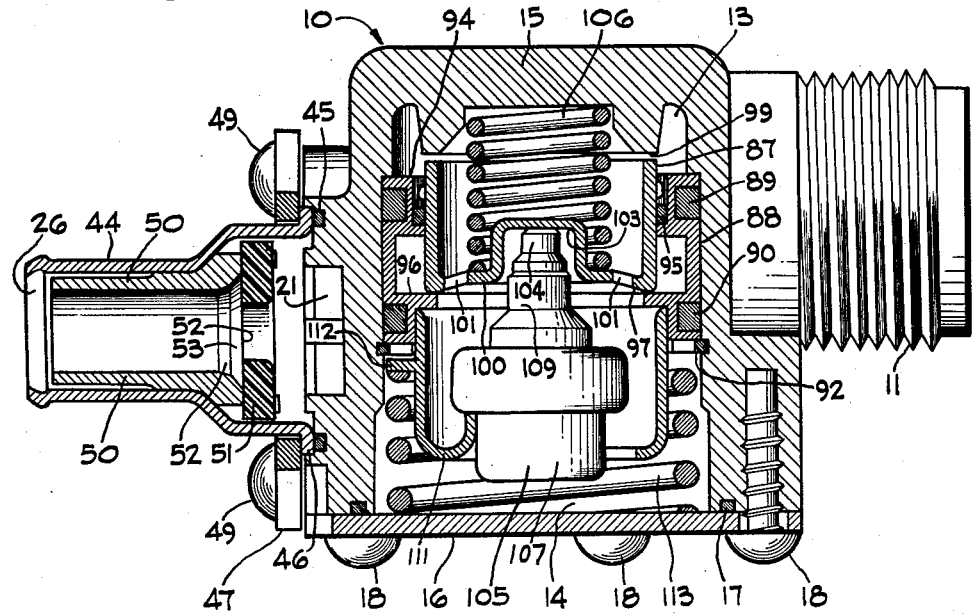
Figure 5 is a sectional view taken substantially along line V—V of Figure 1, and showing the mixing chamber and thermostatic valve therein.

In the embodiment of the invention illustrated in the drawings, the valve is shown as comprising a valve body 10 having spaced hot and cold water inlets 11 and 12, respectively, leading into a metering chamber 13, having a central aligned mixing chamber 14 in direct communication with one end thereof.

The valve body may be molded from one of many of the well known forms of thermoplastic materials. One such material, which has been found to be extremely satisfactory for such a valve, is a "nylon" thermoplastic material, which may readily be molded to the desired form and which is unaffected by the heat of the hot water.

The metering chamber 13 is shown as being closed at one end by an end wall 15 of the valve body. The communicating mixing chamber 14 is shown as being closed by a cover 16 sealed to the valve body by a gasket 17. The cover 16 is retained to the valve body in engagement with said gasket by machine screws 18 threaded in the valve body. The machine screws 18 are shown in Figure 5 as being self-tapping screws.

Figure 10:
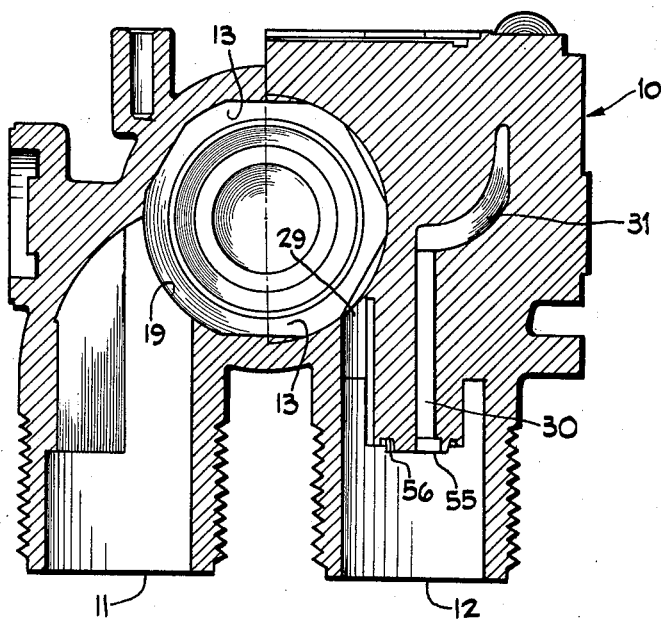
Figure 10 is a fragmentary sectional view taken substantially along line X—X of Figure 2 with certain parts removed.

The hot water inlet 11 is shown in Figure 10 as leading directly to the metering chamber and communicating therewith through a port 19. The hot water inlet also communicates with an annular passageway 20 opening to an end of the valve body and closed by a pressure operated solenoid controlled diaphragm valve 23. The diaphragm valve 23 controls the flow of hot water from the annular passageway 20 through a central port 24 concentric with said annular passageway. A port 25 in the wall of the portion of the valve body defining the port 24 communicates with an outlet 26 from the valve through a passageway 21 leading along the outside of a wall 27 for the metering and mixing chambers 13 and 14 (see Figure 5).

Figure 9:
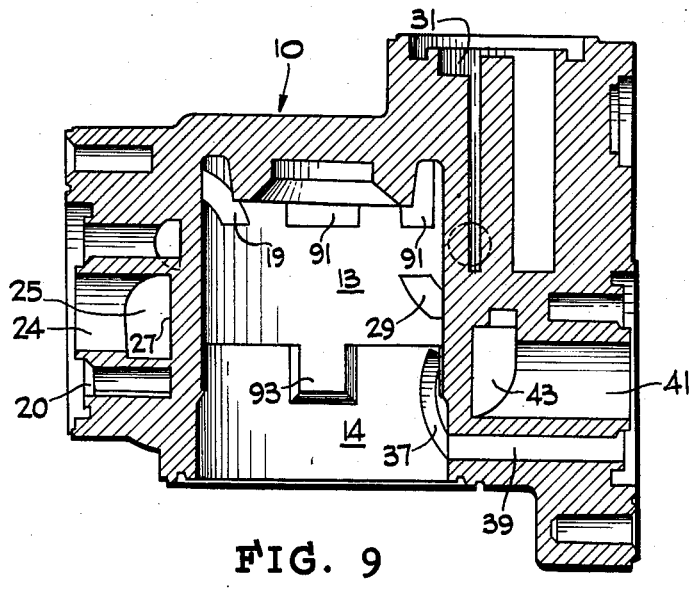
Figure 9 is a fragmentary sectional view taken substantially along line IX—IX of Figure 1 with the solenoid controlled valves and the thermostatic valve removed.

The cold water inlet 12 communicates directly with the metering chamber 13 through a port 29 leading directly into said metering chamber from the inlet 12 and spaced vertically from the hot water inlet port 19 as shown in Figure 9.

Figures 6, 7:
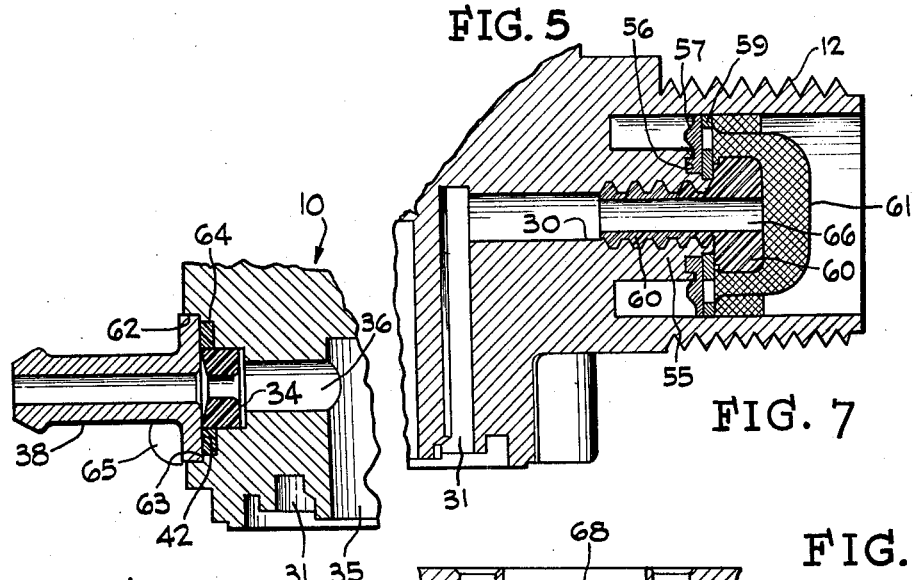
Figure 6 is a fragmentary sectional view taken through the cold water outlet and substantially along line VI—VI of Figure 1.
Figure 7 is a partial fragmentary sectional view taken substantially along line VII—VII of Figure 2 showing the cold water inlet and the fluid passageway for the supply of cold water for condensing purposes.

The cold water inlet 12 is also shown as having a central passageway 30 formed by the inner wall of an annular boss 55 extending along and spaced inwardly of the inner wall of the cold water inlet as shown in Figure 7. The passageway 30 communicates directly with an annular passageway 31 opening to an end of the valve body 10 and closed by a pressure operated solenoid controlled diaphragm valve 33. The diaphragm valve 33 controls the flow of cold water through a port 35 concentric with the annular passageway 31. The port 35 communicates at its inner end with a passageway 36 leading at right angles to the passageway 35 out through a wall of the valve body for discharging cold water through an outlet fitting 38 under the control of a resilient annular flow control device 34 seated against a flat inner face 42 of a flanged portion 62 of the fitting 38 and flexing along said inner face upon increases in pressure in the cold water to afford a substantially uniform flow of cold water through the outlet fitting 38 for condensing purposes, regardless of variations in pressure of the water at the source.

The flow control device 34 operates on principles similar to those disclosed in Patent No. 2,454,929 which issued to Leslie A. Kempton on November 30, 1948. The fitting 38 may be secured to a recessed portion 63 of the valve body into engagement with an annular seal 64 in axial alignment with the flow control device 34 and passageway 36, by self-tapping screws 65.

The boss 55 extending along the cold water inlet 12 terminates short of the inlet end of said inlet and has an annular recess 56 formed therein, which forms a seat for the inner marginal portion of a resilient annular check valve 57, extending outwardly from said boss to the wall of the cold water inlet. The check valve 57 is abutted at its outer face by an apertured washer 59 retained in position on the boss 55 by a hollow screw 60 threaded within said boss and having a passageway 66 leading therealong and having communication with the passageway 30.

Water entering the cold water inlet 12 thus flows through the apertures of the apertured washer 59 and flexes the check valve inwardly with respect to the outer face of the boss 55 to accommodate the flow of fluid along the inlet passageway into the metering chamber 13, but to block the back flow of fluid out through the inlet from the metering chamber and to prevent the mixing of the mixed water with the cold water in the inlet. Water also passes through the passageway 66 in the screw 60 to the annular passageway 31 for supply through the cold water outlet fitting 38 upon opening of the pressure operated diaphragm valve 33. A screen 61, herein shown as being generally hat-shaped in form, is seated in the inlet 12 against the washer 59.

Figure 8:
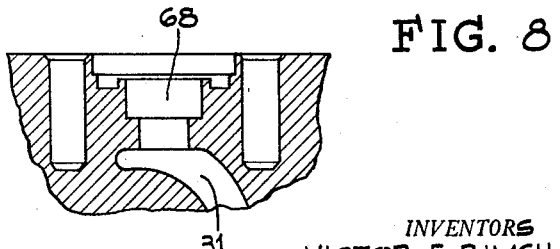
Figure 8 is a partial fragmentary sectional view taken substantially along line VIII—VIII of Figure 2 and showing the uncontrolled cold water outlet for the valve for supplying cold water to actuate a device to be operated.

The valve body 10 is also provided with an uncontrolled cold water outlet passageway 68 having communication with the annular passageway 31 and supplying a continuous flow of cold water through a fitting 69 extending outwardly from the valve body at right angles to the fitting 38 (see Figures 1, 2 and 8).

The cold water passageway 68 in communication with the passageway 31 and the fitting 69 are provided to afford a constant source of supply of cold water, which may be used to supply the pressure to actuate a hydraulically actuated device which may be a hydraulically actuated washing machine clutch or the like. It is, of course, understood that an additional valve means connected with the outlet fitting 69 may be provided to control operation of the actuator under the cyclic control of the washing machine.

The mixing chamber 14 has a port 37 in the wall thereof, having communication with an annular passageway 39 opening to the opposite side of the valve body from the annular passageway 20 and closed by a solenoid controlled pressure operated diaphragm valve 40. When the diaphragm valve 40 is open, tempered water will flow through a central port 41 communicating with a port 43 leading to the passageway 21 leading around the outside of the wall 27 and having communication with the outlet 26, for discharging tempered water through said outlet.

The outlet 26 is shown in Figure 5 as being in the form of a metal fitting 44 sealed to the opposite wall of the valve body 10 from the inlets 11 and 12 by a seal 45 recessed within the wall of the valve body 10. The fitting 44 has a flanged portion 46 abutting the seal 45 and retained in sealing engagement therewith by a yoke 47 engaging the outside of the flanged portion 46, and by machine screws 49, which may be self-tapping screws extending through the yoke 47 and threaded within the valve body 10.

The fitting 44 is shown as having a generally tubular seating and passageway member 50 extending along the outlet 26 of said fitting and forming a seat for a resilient flow control device 51 for maintaining a substantially uniform rate of flow through the outlet 26 regardless of variations in inlet pressure of the fluid entering the valve body through the inlets 11 and 12, as in the aforementioned Kempton Patent No. 2,454,929.

The pressure operated solenoid controlled diaphragm valves 23, 40 and 33 are independently operable to control the flow of hot and tempered water through the passage 21 and outlet 26 and to control the flow of cold water for condensing or other purposes through the outlet 38. The diaphragm valves 23, 33 and 40 are controlled by armatures 70, 71 and 72 of solenoids 73, 74 and 75 respectively, and are each of a similar construction and of a well known form. The hot water diaphragm valve 23, therefore, need only be described herein.

The diaphragm valve 23 is shown as being retained in sealing engagement with the open end of the valve body 10 at its periphery by a yoke 76 abutting an outer flanged portion 77 of an end cap and guide 79, and pressing said flange into engagement with the outer marginal portion of the diaphragm valve 23. Self-tapping screws 80 extending through a flanged portion 81 of a casing 82 for the solenoid and through the yoke 76, are provided to retain the solenoid and casing 82 to the end of the valve body and to retain the end cap 79 in sealing engagement with the marginal portion of the diaphragm valve 23. The end cap 79 forms a guide for the armature 70. A spring 83 seated within the end cap 79 serves to bias a conical end portion 84 of the armature 70 into engagement with a port 85 leading through the center of the diaphragm 23. The diaphragm 23 has a bleeder passageway 86 leading therethrough to pass water from one side of the diaphragm to the other and create a pressure differential on both sides of the diaphragm when the orifice 85 is closed by the conical end portion 84 of the armature 70, and thus to maintain the valve closed by the pressure of the water acting on the outer face thereof. Upon energization of the solenoid 73, the armature 70 will move out of engagement with the central orifice 85, relieving pressure from the outer side of the diaphragm valve 23 and effect the opening of the valve 23 by the pressure of fluid on the under side thereof. When the diaphragm valve 23 is open, upon energization of the solenoid 73, as previously described, fluid under pressure will flow from the annular passageway 20 through the port and passageways 25 and 21 to supply hot water to a washing machine or like device connected with the outlet, 26, or to mix with tempered water flowing from the valve 40 through the passageway 21.

In a like manner, when the solenoid 74 is energized to withdraw the armature 71 from the valve 33, the valve 33 will open and fluid under pressure will pass through the annular passageway 31 and out the port 35 and the passageway 36 through the outlet 38 under control of the flow control member 34, to supply cold water for condensing or other purposes.

Upon energization of the solenoid 75 and withdrawal of the armature 72 from the diaphragm valve 40, mixed water will flow from the mixing chamber 14 out through the port 39 and through the port 41 and passageway 43 through the outlet 26 to provide tempered water for washing or rinsing purposes.

A hollow piston valve 87 is provided to meter hot and cold water into the metering chamber 13 and mixing chamber 14 through the inlet ports 19 and 29, respectively, leading through the wall of the metering chamber 13 and having direct communication with the respective hot and cold water inlets 11 and 12.

The piston valve 87 is guided within a generally cylindrical insert 88 extending along the wall of the metering chamber 13 and apertured to accommodate the flow of cold water therethrough from the port 29. The insert 88 is sealed to the wall of the chamber 13 by spaced seals 89 and 90 and is retained in engagement with inwardly extending projections 91, projecting inwardly from the wall of the chamber 13 by a retainer ring 92 which may be a snap ring snapped in the wall of the chamber 13 into engagement with the outer end of the insert 88. Splines 93 are provided to retain the insert 88 from turning movement within the chamber 13. The insert 88 is also provided with an inwardly extending flanged portion 94 engaging the wall of a piston valve 87 and sealed thereto as by a seal 95. The insert 88 is likewise provided with an annular shoulder 96 extending inwardly therefrom in spaced relation with respect to the flange 94, and forming a seat for an end 97 of the piston valve 87. The opposite end of the piston valve is seated against an inwardly extending annular face 99 of the end wall 15 of the metering chamber 13, to block the passage of hot water into the mixing chamber 14.

The piston valve 87 is provided with a lower wall 100a having flow passageways 101 leading therethrough and having a central dome like portion 103 engaged by a piston 104 of a thermal element 105. The dome like portion 103 is biased into engagement with the piston 104 by a spring 106, seated within the annular face 99 at one end and in the wall 100a of the piston 87 at its opposite end.

The thermal element 105 is shown as being of the so-called power type of thermal element wherein a fusible thermally expansible material contained within a casing 107 of the thermal element extends the piston 104 from a cylinder 109 of the thermal element as the temperature of water in the mixing chamber 14 approaches the fusion point of the thermally expansible material, as shown and described in Patent No. 2,368,181 which issued to Sergius Vernet on January 30, 1945 and no part of our present invention so not herein shown or described further.

The thermal element 105 is seated in a cage 111 slidably guided within the insert 88 and provided with spaced ears or lugs 112 forming a seat for an overtravel spring 113 seated at its opposite end in the closure plate 16 for the mixing chamber 14. The overtravel spring 113 is sufficiently strong to normally act as a solid member but to yield upon excessive temperature conditions to prevent damage to the thermal element, the valve 87 and the valve casing 10.

It will be noted that the hot water inlet passage 19 is to one side of the seal 95 while the cold water inlet passage 29 is to the opposite side of said seal and above the annular seating surface 96 of the retainer 88. Thus when the valve 87 is in the position shown in Figure 5, hot water will enter through the port or passageway 19 and pass through the apertured portions 101 of the piston valve 87 into the mixing chamber 14. As the temperature of the water in the mixing chamber increases to a point which will cause fusion of the fusible thermally expansible material within the casing 107, the piston 104 will be extended from the cylinder 109 to admit cold water through the port 29 into the mixing chamber, to mix with the hot water therein and temper the same, for supply to a washing machine or like device through the tempered water valve 40, as previously described.

It will further be noted that the valve body has a first face 100, through which the mixing chamber 14 opens, which mixing chamber is closed by the cover 16. The valve body also has a second face 200 directly opposite the face 100 having a port 35 leading into the valve body from said face and closed by the diaphragm valve 33. Communication from the cold water inlet 12 through the second face 200 and diaphragm valve 33 is afforded through a passageway 31 having direct communication with the cold water inlet. The valve body also has a third face 300 having the hot and cold water inlets 11 and 12 leading thereinto and has a fourth face 400 directly opposite the face 300 and having the outlet 26 and 38 leading therefrom. The valve body further has a fifth face 500 extending perpendicularly to the faces 300 and 400 and communicating with the hot water inlet 11 through a passageway 20 opening to said fifth face and closed by the diaphragm valve 23. Opposite the face 500 and extending generally parallel thereto is a sixth face 600 communicating with the mixing chamber 14 through a passageway 39 opening to said sixth face and closed by the diaphragm valve 40. The face 600 is also shown in Figure 2 as having an unrestricted cold water outlet leading therefrom having direct communication with the cold water inlet through the outlet passageway 31.

It may here be seen that the valve body and passageway construction described in the foregoing attain a unitary valve particularly adapted for use in a combined washing and drying machine, to be operated under the cyclic control of the machine for supplying hot water or mixed water at intermediate temperatures between the temperature of the hot and cold water by energization of the solenoid 73 or energization of the solenoid 75 or simultaneous energization of the solenoids 73 and 75 and to supply cold water for condensing purposes independently of the supply of water for washing purposes by energization of the solenoid 74, and that the valve of our invention is so arranged as to afford a continuous source of water under pressure to operate an actuator and the like under cyclic control of the machine.

It will be understood that various modifications and variations of the present invention may be effected without departing from the spirit and scope of the novel concepts thereof.

We claim as our invention:

1. In a mixing valve particularly adapted for combined washing and drying machines and the like, a valve body having a central mixing chamber therein, a hot water inlet leading into said mixing chamber, a cold water inlet leading into said mixing chamber, an outlet from said valve body, two independently operable valves controlling the flow of water through said outlet, a first having communication with said hot water inlet and controlling the flow of hot water from said inlet directly through said outlet, a second having communication with said mixing chamber and controlling the flow of tempered water from said mixing chamber through said outlet, said cold water inlet having an inner wall and having an annular boss spaced inwardly from said inner wall, the space between said inner wall and boss defining said inlet leading into said mixing chamber and the inner margin of said annular boss defining a cold water by-pass passageway, a second outlet from said valve body and a third valve having communication with said by-pass passageway and controlling the flow of cold water through said second outlet, a resilient annular check valve seated on the end of said boss and engaging said inner wall of said inlet, and a screw having a passageway leading through the center thereof threaded within said boss and retaining said check valve thereto and forming a passageway member admitting cold water to said by-pass passageway.

2. In a mixing valve, a molded one piece valve body having first, second, third, fourth, fifth and sixth faces disposed at substantially right angles with respect to each other and having a generally cylindrical mixing chamber therein extending substantially therethrough for a greater portion of the distance between said first and second faces of said valve body, two hollow generally cylindrical externally threaded projections extending outwardly from said third face of said valve body, and forming hot an cold water inlet into said valve body, the axes of said projections being in a plane substantially perpendicular to the axis of said cylindrical mixing chamber, a first outlet from said valve body leading through said fourth face and disposed opposite said third face, passageways in said valve body from said hot and cold water inlets to said mixing chamber, a passageway in said valve body from one of said inlets to said second face of said valve body, a passageway in said valve body from the other of said inlets opening to a fifth face of said valve body, a passageway in said valve body from said mixing chamber and opening to a sixth face of said valve body, a second outlet from said valve body leading through said fourth face, an outlet port in said valve body having communication with said first outlet and opening to said fifth face, an outlet port in said valve body having communication with said first outlet and opening to said sixth face, an outlet port in said valve body communicating with said second outlet and opening to said second face, and independently operable solenoid controlled pressure operated diaphragm valves closing the ends of said passageways and ports opening to said second, fifth and sixth faces and controlling the flow through said outlet ports to said first and second outlets under the selected operation of said valves.

3. In a mixing valve, a one piece molded valve body having first, second, third, fourth, fifth and sixth faces generally perpendicular to each other and having a generally cylindrical mixing chamber therein extending substantially therethrough for a greater portion of the distance between said first and second faces of said valve body, two hollow generally cylindrically externally threaded projections extending outwardly from said third face of said valve body and forming hot and cold water inlets leading into said valve body and having direct communication with said mixing chamber, the axes of said projections being in a plane substantially perpendicular to the axis of said cylindrical mixing chamber, a metering valve in said mixing chamber and a thermal element in said mixing chamber for operating said metering valve to admit hot and cold water into said mixing chamber, a first outlet from said valve body through said fourth face thereof and opposite said third face, a passageway in said valve body from one of said inlets opening to said second face of said valve body, a passageway in said valve body from the other of said inlets opening to said fifth face of said valve body, a passageway in said valve body from said mixing chamber opening to said sixth face of said valve body, a second outlet from said valve body opening through said fourth face, an outlet port in said valve body communicating with said first outlet and opening to said fifth face, an outlet port in said valve body communicating with said first outlet and opening to said sixth face, an outlet port in said valve body communicating with said second outlet and opening to said second face, and independently operable solenoid controlled pressure operated diaphragm valves closing the ends of said passageways and parts opening to said second, fifth and sixth faces and controlling the flow of fluid through said outlet ports to said outlets.

References Cited in the file of this patent

UNITED STATES PATENTS

| | | |
|---|---|---|
| 1,886,737 | Raou | Nov. 8, 1932 |
| 1,942,270 | Resek | Jan. 2, 1934 |
| 2,453,409 | Chace | Nov. 9, 1948 |
| 2,620,133 | Obermaier | Dec. 2, 1952 |
| 2,620,134 | Obermaier | Dec. 2, 1952 |
| 2,672,157 | Branson | Mar. 16, 1954 |
| 2,712,324 | Lund | July 5, 1955 |